3,070,629
PROCESS OF MAKING α,β-UNSATURATED KETONES AND PRODUCTS
Guenther Ohloff and Gerhard Schade, Holzminden (Weser), Germany, assignors to DRAGOCO Gerberding & Co., G.m.b.H., Holzminden (Weser), Germany, a company of Germany
No Drawing. Filed Feb. 4, 1960, Ser. No. 6,600
Claims priority, application Germany Feb. 12, 1959
10 Claims. (Cl. 260—586)

The present invention relates to a process of making α,β-unsaturated ketones, and more particularly to a process of making α,β-unsaturated cyclic ketones.

It is one object of the present invention to provide a simple and effective one-step process of converting cyclic 1,3-dienes into α,β-unsaturated cyclic ketones.

This and other objects of the present invention and advantageous features thereof will become apparent as the description proceeds.

In principle the present invention comprises converting cyclic 1,3-diene hydrocarbons, such as 1-methyl-Δ$^{1,5}$-cyclohexadiene and 1-methylene-Δ$^2$-cyclohexene and derivatives thereof into α,β-unsaturated cyclic ketones by using a one-step process of treating such dienes with hydrogen halides and oxidizing the addition compounds by means of an aqueous bichromate solution while stirring vigorously the reaction mixture.

The process according to the present invention may be illustrated by the following equation:

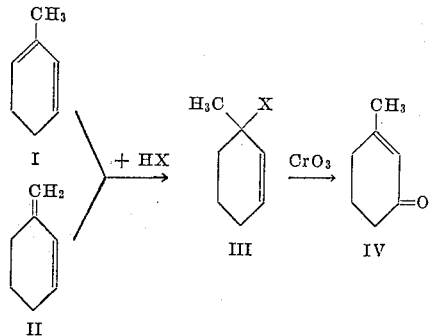

The Formulas I and II represent 1,3-diene hydrocarbons which serve as starting materials for the preparation of the desired α,β-unsaturated ketones of Formula IV. The compounds of Formulas I and II may be substituted by alkyl and alkenyl radicals. Such compounds correspond, for instance, to the following Formulas V and VI

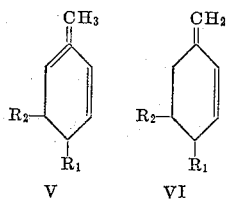

wherein:

$R_1$ and $R_2$ are hydrogen or alkyl or alkenyl radicals with less than 10 carbon atoms, such as the methyl, isopropyl, dimethyl hexenyl radicals.

One of the double bonds may also form part of another ring attached to the cyclohexene ring. Such a compound is, for instance, Δ$^{3,5}$-cholestadiene wherein the second double bond is in ring B of the cholestadiene molecule. This double bond corresponds to the methylene group of Formula VI and represents a substituted methylene group.

In general all cyclohexane compounds having conjugated double bonds in their molecule either in the cyclohexane ring or one double bond in the cyclohexane ring and the other double bond in conjugation therewith and attached thereto are suitable for the process according to the present invention.

There have been known several methods of synthesizing α,β-unsaturated ketones. For instance, oxygen was introduced into the molecule by means of different oxidation methods at the methylene group activated by a tri-substituted cyclic double bond. However, the preparation of α,β-unsaturated ketones of the Formula IV from substituted cyclohexadienes has not been described heretofore.

It is quite surprising and rather unexpected that, according to the present invention, 1,3-dienes of the Formulas I or II as illustrated to in the above equation can be converted into α,β-unsaturated ketones of the Formula IV in excellent yields and in a substantially one step operation, if the hydrocarbons of the Formulas I or II are first treated with hydrogen halide and then oxidized preferably by means of an aqueous alkali metal bichromate solution while stirring vigorously.

Selective addition of hydrogen halide to the tri-substituted double bond to form an allyl halide configuration of Formula III is carried out at a temperature of about 0° C. whereby it makes no difference whether an inert solvent is used or not. Oxidative conversion of the resulting cyclic allyl halide into the desired α,β-unsaturated ketone is always accompanied by an elimination of hydrogen halide whereby a mixture of 1,3-dienes is formed. Thus part of the starting material is recovered and can be recycled. This side-reaction which results in a decrease in the yield of the desired α,β-unsaturated ketones is more pronounced when proceeding by way of the allyl bromides than by way of the allyl chlorides. It is, therefore, the preferred procedure to carry out chromic acid oxidation with the more stable allyl chlorides of Formula III of the above given equation. Oxidation of the less stable monohalogen derivatives of Formula III is preferably effected at a temperature below 0° C. whereas the more stable halides, such as the allyl chlorides, can be oxidized at room temperature.

The simplest starting materials for the preparation of the desired α,β-unsaturated ketones are hydrocarbons such as 1-methyl-Δ$^{1,5}$-cyclohexadiene and 1-methylene-Δ$^2$-cyclohexene of the Formulas V and VI, wherein $R_1$ and $R_2$ are hydrogen. Other starting materials may be substituted by $R_1$ or, respectively, $R_2$ being a methyl group and $R_2$ or, respectively, $R_1$ being hydrogen. There can also be used hydrocarbons in which $R_1$ is an isopropyl group and $R_2$ is hydrogen such as α-phellandrene of Formula V or in which $R_1$ is hydrogen and $R_2$ is an isopropyl group such as β-phellandrene of Formula VI. $R_1$ in Formulas V or VI can also be an unsaturated aliphatic residue provided that the double bond in this unsaturated residue is unaffected by hydrogen halide. Examples of this class of compounds are, for instance, the two isomer zingiberenes of Formulas V and VI wherein $R_1$ is a dimethyl hexenyl radical and $R_2$ hydrogen.

As stated above, the tri-substituted double bond of the 1,3-diene system may also belong to a second ring. It is a necessary requirement of the present invention of producing α,β-unsaturated ketones of Formula IV to provide intermediates of the allyl halide type of Formula III. Thereby, the double bonds may also be displaced.

The process according to the present invention is illustrated by the following examples which, however, are not intended to limit the present invention thereto.

*Example 1*

36.5 g. of hydrogen chloride are introduced into 94 g. (1 mole) of 1-methyl-Δ$^{1,5}$-cyclohexadiene at −10° C. within about 5 minutes. Thereafter, no more hydrogen chloride is absorbed.

A solution containing 120 g. of sodium bichromate in 400 cc. of water is added to the resulting crude monohydrochloride within 20 minutes while stirring vigorously. After one hour 150 cc. of 50% sulfuric acid are poured into the reaction mixture and the volatile compounds are distilled off by steam distillation. The reaction products (82 g.) are collected in a receptacle, separated from the aqueous layer, and subjected to fractional distillation. 66 g. (70%) of substantially pure 1-methyl-$\Delta^1$-cyclohexenone-3- of the following properites: Boiling point: 77–79°C./11 mm.; $d_2^{20}=0.975$; $n_D^{20}=1.4948$; melting point of its semicarbaxone: 199–210° C., are obtained.

After destroying the chromium complex by means of sulfuric acid, the oxidation product may be isolated by extraction by means of solvents such as benzene, toluene, petroleum ether, pentane and hexane.

Example 2

Hydrogen chloride is passed into 94 g. (1 mole) of 1-methylene-$\Delta^2$-cyclohexene dissolved in 100 cc. of petroleum ether until 1 mole (36.5 g.) of hydrogen chloride are absorbed. The conditions are the same as described in Example 1. Oxidation of the resulting dissolved monohydrochloride of the Formula III is carried out with a solution containing 120 g. of sodium bichromate in 400 cc. of water. After destroying the chromium complex by means of 50% sulfuric acid, the crude ketone is present in the solvent layer. 62 g. (66%) of pure 1-methyl-$\Delta^1$-cyclohexenone-3 are distilled off from the reaction mixture. Boiling point: 76–78° C./10 mm.; $d_4^{20}=0.973$; $n_D^{20}=1.4949$; melting point of its semicarbazone: 199–201° C. The semicarbazone does not show a melting point depression when mixed with the corresponding compound of Example 1.

Example 3

108 g (1 mole) of 1-methylene-3-methyl-$\Delta^5$-cyclohexene (Formula VI: $R_1=H$, $R_2=CH_3$) are treated with 36.5 g. of hydrogen chloride at 0° C. A solution of 120 g. of sodium bichromate in 400 cc. of water is added to the resulting crude mono-hydrochloride. Reaction is accelerated by vigorous stirring at room temperature for half an hour. After adding 150 cc. of 50% sulfuric acid, the ketone is removed from the reaction mixture by steam distillation. The distillate is worked up in the usual manner and yields 78 g. of 1,5-dimethyl-$\Delta^1$-cyclohexenone-3 of the following characteristics: Boiling point: 210–212° C./754 mm.; $d_4^{20}=0.9406$; $n_D^{20}=1.4826$; melting point of its semicarbazone: 168–171° C.

Example 4

136 g. (1 mole) of $\alpha$-phellandrene (Formula V: $R_1$=isopropyl, $R_2$=H) are dissolved in 500 cc of anhydrous petroleum ether; 36.5 g. (1 mole) of gaseous hydrogen chloride are introduced into the solution at $-10°$ C. while stirring vigorously. Addition of hydrogen chloride which is completed after a few minutes is accompanied by the evolution of heat. 120 g. of sodium bichromate dissolved in 400 cc. of water are added to the resulting solution containing the phellandrene mono-hydrochloride at about 0° C. while cooling extrenally. Thereby, the reaction mixture is stirred vigorously. The temperature of the reaction mixture is allowed gradually to increase to room temperature and the chromium complex of the corresponding ketone is destroyed by carefully adding drop by drop 200 cc. of 50% sulfuric acid while cooling. The solvent layer is separated from the aqueous layer and is washed by means of sodium carbonate solution until neutral. Piperitone formed by this reaction is quantitatively separated from the accompanying hydrocarbons by fractional distillation by means of a short fractionating column. The yield is 122 g. corresponding to a yield of 90% based on reacted starting material. Piperitone obtained thereby has the following characteristic properties: Boiling point: 67–68° C./1.4 mm.; $d_4^{20}=0.9340$; $n_D^{20}=1.4837$; $[\alpha]_D^{20}=50.80°$; $\lambda_{max.}=255$ m$\mu$.

Example 5

One mole of gaseous hydrochloric acid is introduced into 136 g. (1 mole) of $\beta$-phellandrene (Formula VI: $R_1$=isopropyl, $R_2$=H) at $-2°$ C. while stirring vigorously. A solution of 140 g. sodium bichromate in 400 cc. of water is added drop by drop to the resulting monohydrochloride at room temperature. The chromium complex of piperitone is destroyed with 50% sulfuric acid while cooling externally and the precipitated oil is dissolved in petroleum ether. The neutral solution is steam-distilled. The oily distillate is subjected to fractional distillation. 126 g. (93%) of pure piperitone are obtained: Boiling point: 115–117° C./20 mm.; $d_4^{20}=0.9341$; $n_D^{20}=1.4843$; $[\alpha]_D=52°$; $\lambda_{max.}=255$ m$\mu$.

Example 6

A moderate stream of hydrogen bromide is introduced into 136 g. (1 mole) of $\alpha$-phellandrene at $-10°$ C. Absorption is completed as soon as 81 g. (1 mole) of gaseous hydrogen bromide are introduced. A solution of 120 g. of sodium bichromate in 400 cc. of water at $-3°$ C. is added to the resulting crude phellandrene monohydrobromide while stirring vigorously. The chromium complex is destroyed with 200 cc. of 50% sulfuric acid and the temperature of the reaction mixture is allowed slowly to increase to room temperature. The crude ketone is separated from the reaction mixture by extraction with petroleum ether. 86 g. of pure piperitone are obtained by fractional distillation corresponding to a yield of 63.4%. Boiling point: 93–95° C./10 mm.; $d_4^{20}=0.9338$; $n_D^{20}=1.4845$; $[\alpha]_D=-51°$; $\lambda_{max.}=255$ m$\mu$.

Example 7

One mole of hydrogen chloride is introduced into 136 g. (1 mole) of $\Delta^{1,5}$-m-methadiene (Formula V: $R_1$=H, $R_2$=isopropyl) in the same manner as described in the previous examples. Oxidation is carried out with a solution of 120 g. of sodium bichromate in 400 cc. of water at room temperature. After working up the reaction mixture in the usual manner, 92 g. of 1-methyl-5-isopropyl-$\Delta^1$-cyclohexenone-3 are obtained corresponding to a yield of 67.6%. This ketone has the following characteristic properties: Boiling point: 167°–243° C./752 mm.; $d_4^{20}=0.935$; $n_D^{20}=1.4865$; melting point of its semicarbazone: 167° C.

Example 8

204 g. (1 mole) of zingiberene from ginger oil (mixture of hydrocarbons of the Formulas V and VI, wherein $R_1$ is a dimethyl hexenyl radical and $R_2$ is H) are treated with gaseous hydrogen chloride at $-5°$ C. to $-10°$ C. in the absence of solvents. The resulting mono-hydrochloride is oxidized with 140 g. of sodium bichromate in 400 cc. of water at room temperature. The chromium complex is destroyed by admixing 250 cc. of benzene or petroleum ether as protecting solvent and then adding drop by drop 150 cc. of a 50% sulfuric acid at 0° C. 131 g. of the pure ketone corresponding to a yield of 64% are obtained. The ketone corresponds to the following formula VII wherein $R_1$ is a dimethyl hexenyl radical and $R_2$ is hydrogen.

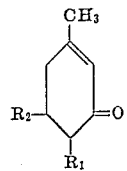

VII

Characteristic properties: $d_4^{20}=0.9365$; $n_D^{20}=1.4977$. The product is new and has taste and odor of the highly valuable terpene-free ginger oil.

Example 9

36.5 g. of gaseous hydrogen chloride are introduced into a solution of 32.4 g. (0.1 mole) of $\Delta^{3,5}$-cholestadiene in 300 cc. of petroleum ether. A solution of 20 g. of sodium bichromate in 80 cc. of water is added at room temperature to the solution of the resulting mono-hydrochloride while stirring vigorously. 30 cc. of a 50% sulfuric acid are then added and the supernatant solvent layer is washed with water until neutral. The solvent layer is dried and filtered through 200 cc. of aluminum oxide of the chromatographic activity I. The solvent is removed by evaporation. 27 g. of $\Delta^4$-cholestenone-3 corresponding to a yield of 83% are obtained. The ketone has the following properties: Melting point: 80° C.; $[\alpha]_D^{20} = +81°$ (in chloroform$_3$); $\lambda_{max} = 240$ m$\mu$.

It is understood that other 1,3-diene hydrocarbons than those used as starting materials in the preceding examples may be employed in the process according to the present invention such as $\Delta^{3,5}$-androstadiene.

The $\alpha,\beta$-unsaturated ketones obtained according to the present invention are compounds useful for many purposes. The compounds of Examples 1 to 8, for instance, can be used in perfumery or as intermediates in the manufacture of aromatic substances as well as of pharmaceutical compounds. The use of cholestenone-3 of Example 9 in steroid hormone synthesis is also known.

Addition of hydrogen halide to the diene is effected in a substantially anhydrous medium. Although, as stated hereinabove, the preferred temperature of addition should not exceed 0° C., it is possible to operate at a higher temperature such as room temperature and up to about 50° C. However, operation at a low temperature not exceeding 0° C. permits introduction of the hydrogen halide with a high speed because the heat of reaction can readily be dissipated thereby.

Oxidation of the resulting hydrogen halide addition compounds is an exothermic reaction. Therefore, the temperature, as stated hereinabove, should preferably not exceed room temperature and, in the case of hydrogen bromide, addition compounds, 0° C. However, hydrogen chloride addition compounds of slow reactivity may be oxidized at even higher temperatures up to 60° C.

The present invention may also be applied to cyclohexadiene compounds of the following Formula VII which, on addition of hydrogen halide, yield the addition compound for Formula VIII. Oxidation of said addition compound VIII produces the compound of Formula IX which is also obtained from the diene compounds of Formulas V and VI:

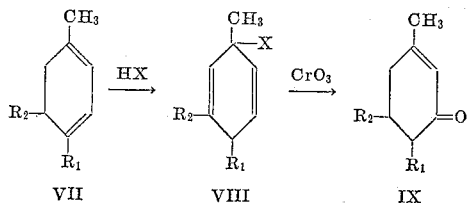

VII      VIII      IX

In said formula $R_1$ and $R_2$ as well as X represent the same substituents as indicated hereinabove. This reaction is described in detail in the following example, although it is not limited thereto.

*Example 10*

One mole of gaseous hydrogen chloride is introduced at a temperature not exceeding 0° C. into 136 g. (1 mole) of $\alpha$-terpinene (Formula VII: $R_1$=isopropyl, $R_2$=hydrogen) while stirring vigorously. The resulting crude monohydrochloride is added drop by drop at room temperature into 500 cc. of a 35% sodium dichromate solution while continuing vigorous stirring. Thereby, the chrominum complex is formed instantaneously with exothermic reaction. Said chromium complex is destroyed as described in the preceding examples by means of sulfuric acid. The resulting piperitone is worked up in the manner described in said examples. The yield, after fractional distillation is 118 g. of pure piperitone corresponding to a yield of 87.8% of the theoretical yield. Boiling point: 93–95° C./10 mm.; $d_4^{20} = 0.9340$; $n_D^{20} = 1.4843$; $[\alpha]_D^{20} = \pm 0°$; $\lambda_{max.} = 255$ m$\mu$.

Of course many changes and vartions in the starting materials employed, in the reaction conditions, temperature, and duration, in the method of working up the reaction mixture and of isolating and purifying the reaction products may be made by those skilled in the art in accordance with the principles set forth herein and in the claims annexed hereto.

We claim:
1. In a process of producing $\alpha,\beta$-unsaturated ketones of the formula

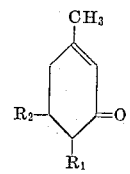

wherein:

$R_1$ and $R_2$ indicate members selected from the group consisting of hydrogen, alkyl radicals, and alkylene radicals, said alkyl and alkylene radicals having less than 10 carbon atoms, the steps which comprise introducing gaseous hydrogen halide selected from the group consisting of hydrogen chloride and hydrogen bromide at a temperature not substantially exceeding 0° C. into an unsaturated cyclohexane compound selected from the group consisting of a cyclohexadiene compound of the formula

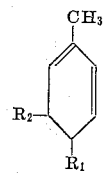

a cyclohexadiene compound of the formula

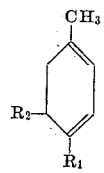

and a cyclohexene compound of the formula

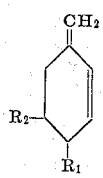

in which formulas $R_1$ and $R_2$ represent the same members as indicated above, until one mole of said hydrogen halide is added to the unsaturated cyclohexane compound, and oxidizing the resulting halogenated cyclohexene compound of the formula

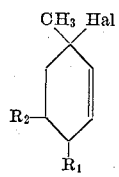

wherein $R_1$ and $R_2$ represent the same members as indicated above and Hal indicates a halogen selected from the group consisting of chlorine and bromine by the action of an aqueous alkali metal dichromate solution at a temperature not substantially exceeding 0° C. until the $\alpha,\beta$-unsaturated ketone of the formula

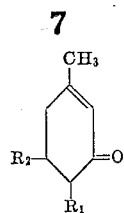

is formed.

2. The process according to claim 1, wherein the hydrogen halide is hydrogen chloride.

3. The process according to claim 1, wherein the gaseous hydrogen halide is introduced into a solution of the unsaturated cyclohexane compound in an inert organic solvent.

4. The process according to claim 2, wherein the inert organic solvent is petroleum ether.

5. In a process of producing 1-methyl-$\Delta^1$-cyclohexenone-3, the steps which comprise introducing gaseous hydrogen chloride at a temperature not exceeding 0° C. into 1-methyl-$\Delta^{1,5}$-cyclohexadiene until one mole of hydrogen chloride is added to said diene, oxidizing the resulting 1-methyl-1-chloro-$\Delta^2$-cyclohexene by the action of an aqueous alkali metal dichromate solution at room temperature, while stirring vigorously, until 1-methyl-$\Delta^1$-cyclohexenone-3 is formed, gradually adding about 50% sulfuric acid to the reaction mixture to decompose the chromium complex formed, and subjecting the mixture to steam distillation and the non-aqueous steam-distillate to fractional distillation to separate said 1-methyl-$\Delta^1$-cyclohexenone-3 from by-products.

6. In a process of producing 1-methyl-$\Delta^1$-cyclohexenone-3, the steps which comprise introducing gaseous hydrogen chloride at a temperature not exceeding 0° C. into a solution of 1-methylene-$\Delta^2$-cyclohexene in petroleum ether, until one mole of hydrogen chloride is added to said diene, oxidizing the resulting 1-methyl-1-chloro-$\Delta^2$-cyclohexene by the action of an aqueous alkali metal dichromate solution at room temperature while stirring vigorously until 1-methyl-$\Delta^1$-cyclohexenone-3 is formed gradually adding about 50% sulfuric acid to the reaction mixture to decompose the chromium complex formed, and subjecting the solvent layer to steam distillation and the non-aqueous steam-distillate to fractional distillation to separate said 1-methyl-$\Delta^1$-cyclohexenone-3 from by-products.

7. In a process of producing piperitone, the steps which comprise introducing gaseous hydrogen chloride at a temperature not exceeding 0° C. into phellandrene until one mole of hydrogen chloride is added to said diene, oxidizing the resulting phellandrene-monohydrogen chloride addition compound by the action of an aqueous alkali metal dichromate solution at a temperature between about 0° C. and about room temperature, while stirring vigorously, until piperitone is formed, gradually adding about 50% sulfuric acid to the reaction mixture to decompose the chromium complex formed, and subjecting the mixture to steam distillation and the non-aqueous steam-distillate to fractional distillation to separate said piperitone from by-products.

8. In a process of producing 1-methyl-5-isopropyl-$\Delta^1$-cyclohexenone-3, the steps which comprise introducing gaseous hydrogen chloride at a temperature not substantially exceeding 0° C. into $\Delta^{1,5}$-m-menthadiene, until one mole of hydrogen chloride is added to said diene, oxidizing the resulting 1-methyl-1-chloro-5-isopropyl-$\Delta^2$-cyclohexene by the action of an aqueous alkali metal dichromate solution at room temperature, while stirring vigorously, until 1-methyl-5-isopropyl-$\Delta^1$-cyclohexenone-3 is formed, gradually adding about 50% sulfuric acid to the reaction mixture to decompose the chromium complex formed, and subjecting the mixture to steam distillation and the non-aqueous steam-distillate to fractional distillation to separate said 1-methyl-5-isopropyl-$\Delta^1$-cyclohexenone-3 from by-products.

9. In a process of producing 1-methyl-4-(6',6'-dimethyl-$\Delta^5$-hexenyl-2')-$\Delta^1$-cyclohexenone-3, the steps which comprise introducing gaseous hydrogen chloride at a temperature not substantially exceeding 0° C. into zingiberene until one mole of hydrogen chloride is added to said diene, oxidizing the resulting zingiberene-monohydrogen chloride addition compound by the action of an aqueous alkali metal dichromate solution at room temperature, while stirring vigorously, until 1-methyl-4-(6',6'-dimethyl-$\Delta^5$-hexenyl-2')-$\Delta^1$-cyclohexenone-3 is formed, gradually adding about 50% sulfuric acid to the reaction mixture to decompose the chromium complex formed, and subjecting the mixture to steam distillation and the non-aqueous steam distillate to fractional distillation to separate said 1-methyl-4-(6',6'-dimethyl-$\Delta^5$-hexenyl-2')-$\Delta^1$-cyclohexenone-3 from by-products.

10. In a process of producing piperitone, the steps which comprise introducing gaseous hydrogen bromide at a temperature not substantially exceeding 0° C. into phellandrene until one mole of hydrogen bromide is added to said diene, oxidizing the resulting phellandrene monohydrogen bromide addition compound by the action of an aqueous alkali metal dichromate solution at a temperature not substantially exceeding 0° C., while stirring vigorously, until piperitone is formed, gradually adding about 50% sulfuric acid to the reaction mixture to decompose the chromium complex formed, extracting the resulting ketone from the mixture by means of petroleum ether, and subjecting the extract to fractional distillation to separate said piperitone from by-products.

References Cited in the file of this patent

UNITED STATES PATENTS 2,827,499     Bain et al. _____ Mar. 18, 1958
2,831,028     Bain et al. _____ Apr. 15, 1958

OTHER REFERENCES

Beilstein, Organische Chemie, vol. VII (1st supplement), page 184, (1931).

Mukherji et al.: J. Am. Chem. Soc., vol. 75, pp. 4698–4700, (1953).